United States Patent [19]
Barber et al.

[11] 3,908,381
[45] Sept. 30, 1975

[54] GEOTHERMAL ENERGY CONVERSION SYSTEM FOR MAXIMUM ENERGY EXTRACTION

[75] Inventors: Robert E. Barber; Kenneth E. Nichols, both of Arvada; Daryl R. Prigmore, Wheatridge, all of Colo.

[73] Assignee: Sperry Rand Corporation, New York, N.Y.

[22] Filed: Nov. 20, 1974

[21] Appl. No.: 525,534

[52] U.S. Cl. ................... 60/641; 60/671; 60/677
[51] Int. Cl.² .............................. F03G 7/00
[58] Field of Search ............ 60/641, 643, 645, 651, 60/670, 671, 677, 679

[56] References Cited
UNITED STATES PATENTS

| | | | |
|---|---|---|---|
| 2,957,815 | 10/1960 | Pacault et al. | 60/677 X |
| 3,150,487 | 9/1964 | Mangan et al. | 60/39.18 B |
| 3,824,793 | 7/1974 | Matthews | 60/641 |

*Primary Examiner*—Martin P. Schwadron
*Assistant Examiner*—Allen M. Ostrager
*Attorney, Agent, or Firm*—Howard P. Terry

[57] ABSTRACT

A geothermal energy transfer and energy utilization system makes use of thermal energy stored in hot solute-bearing well water to generate super-heated steam from an injected flow of clean water; the super-heated steam is then used for operating a turbine-driven pump at the well bottom for pumping the hot solute-bearing water or brine at high pressure and always in liquid state to the earth's surface, where it is used by transfer of its heat to a closed-loop heat exchanger-turbine-alternator combination for the generation of electrical power. The steam exhausted from the deep well pump-driving turbine is also returned to the earth's surface, where its residual energy is efficiently extracted in the surface power generating system and where it is then converted into cooled water for return to the deep well pumping system. Residual concentrated solute-bearing water is normally pumped back into the earth.

9 Claims, 1 Drawing Figure

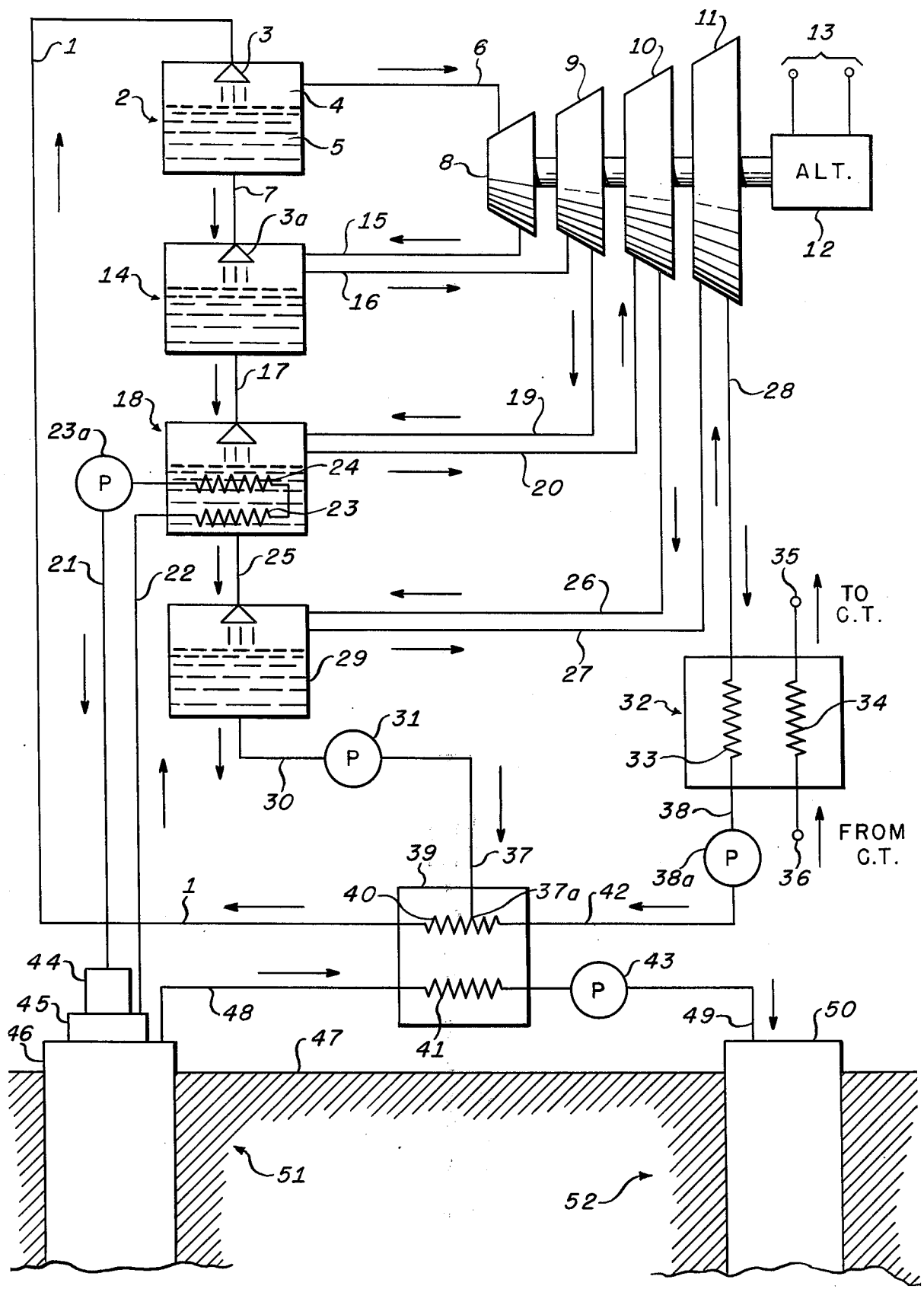

GEOTHERMAL ENERGY CONVERSION SYSTEM FOR MAXIMUM ENERGY EXTRACTION

BACKGROUND OF THE INVENTION

1. Field of the Invention

The invention relates generally to efficient means for the generation of electrical or other power utilizing energy from geothermal sources and more particularly, relates to arrangements including efficient super-heated steam generation pumping and surface-located power generation equipment for use with deep hot water wells for the transfer of thermal energy for use at the earth's surface.

2. Description of the Prior Art

The H. B. Matthews patent application Ser. No. 300,058 for a "Geothermal Energy System and Method," filed Oct. 24, 1973, assigned to the Sperry Rand Corporation and issued July 23, 1974, as U.S. Pat. No. 3,824,793, provides for efficient electrical power generation by employing energy derived from geothermal sources through the generation of dry super-heated steam and the consequent operation of sub-surface equipment for pumping extremely hot well water at high pressures upward to the earth's surface. Clean water is injected at a first or surface station into the deep well where thermal energy stored in the hot solute-bearing deep well water is used at a second or deep well station to generate super-heated steam from the clean water. The resultant dry super-heated steam is used at the well bottom for operating a turbine-driven pump for pumping the hot solute-bearing well water to the first station at the earth's surface, the water being pumped at all times and locations in the system at pressures which prevent flash steam formation. The highly energetic water is used at the surface or first station in a binary fluid system so that its thermal energy is transferred to a closed-loop surface-located heat exchanger-turbine system for driving an electrical power alternator. The exhausted steam from the pump-driving turbine is also returned to the earth's surface to have its residual energy extracted according to one method and to be used by the power generation system. Cooled, clean water is thus regenerated by the surface system for re-injection into the well for continued operation of the steam turbine therein. Undesired solutes are pumped back into the earth via a separate well in the form of a concentrated brine.

SUMMARY OF THE INVENTION

The invention is an improvement in deep well geothermal systems of the kind described in the aforementioned U.S. Pat. No. 3,824,793; according to the present invention, there is provided an efficient means for the generation of electrical power at the earth's surface, using energy extracted from the geothermal source. The apparatus includes means for the efficient generation of super-heated steam and a steam driven pumping system at the well bottom operated for transfer of hot brine or water to the earth's surface where its energy content is beneficially used for power generation. When the hot water reaches the earth's surface, its energy is first transferred to a secondary working fluid flowing in a closed surface-located loop from which the well brine is excluded and employing an array of flash separators and a multistage vapor turbine for cooperative production of useful power. Since the pressure of the exhaust steam from the pump-driving turbine is above atmospheric pressure when it arrives at the earth's surface so as to prevent air from leaking into the system, it is advantageous to recover at the surface the exhaust steam latent heat and the super-heated energy gained by the steam while traveling up the exhaust pipe surrounded by the flow of hot well water. Such is accomplished in the present invention by contribution of the exhaust steam energy to a flash tank associated with one of the last stages of the surface-located power turbine.

BRIEF DESCRIPTION OF THE DRAWINGS

The sole drawing is a diagrammatic representation of the novel power generation apparatus at the earth's surface showing its connections to the deep well geothermal pumping apparatus illustrated in partial cross section.

DESCRIPTION OF THE PREFERRED EMBODIMENTS

The sole FIGURE illustrates the novel power generator system and the general structure of that portion 51 of the novel geothermal energy extraction system which is immersed in a deep well extending into strata far below the surface 47 of the earth, preferably being located at a depth below the surface 47 such that a copious supply of extremely hot water under high pressure is naturally available, the active pumping structure being located adjacent the subterranean hot water source and within a generally conventional well casing pipe 46. The configuration in the sole FIGURE is seen to include a well head section 44, 45, 46 located at the earth's surface 47 with a main well section 51 extending downward from the well head section far below the earth's surface 47. At the subterranean source of hot, high pressure water, the main well section joins a steam generator input section as in the disclosure of the aforementioned Matthews patent. A steam generator section, a steam turbine section, a power plant rotary bearing section, and a hot water pumping section follow in close cooperative succession at increasing depths.

Extending downward from the well head section at the earth's surface 47, the well casing pipe 46 surrounds in preferably concentric relation an innermost alloy steel pipe 44 for supplying a flow of relatively cool and relatively pure water at the bottom of the well for purposes yet to be explained. A second relatively large pipe or conduit 45 of similar quality and surrounding pipe 44 is also provided within well casing 46, extending from the well head to the energy conversion and pumping system at the bottom of the well and permitting turbine exhaust steam to flow to the surface of the earth.

It will be understood in the sole FIGURE that relatively clean and cold water is pumped down the inner pipe 44 from the surface station to a point of division at which the downward flowing water is divided between two branch paths. A first branch path feeds clean water for lubricating a system of turbine and pump bearings within the deep well system bearing section. The second branch path feeds clean water through a pressure regulator system and via distribution pipes to a steam generator. Accordingly, high pressure steam is generated and delivered to a steam turbine located within the tubine section.

The function of the turbine as supported on bearings located within the bearing section is to drive a hot water pump located at the pump section. Hot, high pressure water is thus impelled upward in the deep well by the rotating pump vanes of the pump; the hot water is pumped upward at high velocity in the annular conduit between pipes 45 and 46, thus permitting use of the thermal energy it contains at the earth's surface, as will be further described. More important, the hot water is pumped upward to the earth's surface 47 at a pressure preventing it from flashing into steam and thus undesirably depositing dissolved salts at the point of flashing.

Accordingly, it is seen that the extremely hot, high-pressure well water is pumped upward, flowing in the annular region defined by alloy pipes 45 and 46. Heat supplied by the hot well water readily converts the clean water flowing into the deep well steam generator into highly energetic, dry, super-heated steam. The clean water arriving at the bottom of the deep well is at a very high pressure due to its hydrostatic head and usualy also to pressure added by a surface pump 23a yet to be discussed, so that it may not flash into steam. The aforementioned pressure regulator system then controls the pressure of the clean water flowing therethrough so that it may be vaporized and super-heated in the volume of the deep well steam generator. The highly energetic steam drives the steam turbine and is redirected to flow upward to the earth's surface 47 after expansion and exhaust as relatively cool steam flowing within the annular conduit defined between alloy pipes 44 and 45. Thermal energy is efficiently recovered, as will be discussed, at the earth's surface in part from the hot, high pressure water and also is retrieved from the turbine exhaust steam. It will be understood that the deep well apparatus thus far described is substantially that described in the aforementioned Matthews U.S. Pat. No. 3,825,793. Such apparatus is also described and additionally claimed in the Matthews patent application Ser. No. 468,130, filed May 8, 1974, for a "Geothermal Energy System and Method" and assigned to the Sperry Rand Corporation.

In the FIGURE, it is seen that the deep well portion 51 of the system is coupled to the surface-located energy recovery and power generation system by an arrangement of pipes or conduits. The clean cool water is continuously supplied in the deep well when the system is in its equilibrium operating condition from the return water pipe 21, which latter may be regarded as an extension of the alloy steel pipe 44 extending deep into the well. The well turbine exhaust-steam return pipe 45 is connected to pipe 22 for use of its steam, as will be described, in the energy conversion system. The hot water or brine pumped upward in the volume between steam return pipe 45 and the well casing pipe 46 is coupled by pipe 48 into the surface-located system, wherein it supplies a major portion of the energy derived from the geothermal well. For the latter purpose, pipe 48 is coupled to an energy exchanger element 41 of conventional type found within a liquid containing heat exchanger or boiler vessel 39. After a major portion of its thermal energy is transferred in the heat exchanger vessel 39, the well water is returned via pipe 49 to a re-injection well indicated at 52 and provided with a well casing pipe 50 extending deep into the earth. It will generally be required that an auxiliary booster pump 43 be placed between heat exchanger 39 and the re-injection well 52, so as to assure that the hot water is pumped deep back into the earth, thus preventing pollution of land and water adjacent the geothermal well system. The reinjection well 52 may be located at some distance from the geothermal well 51 or may be used cooperatively as a re-injection well for several such geothermal wells. Thus, a major portion of dissolved mineral salts pumped to the surface in solution in the hot water in pipe 48 is returned safely into the ground. The well 52 may pass these corrosive liquids into an earth stratum differing from the original hot well water source or into the same general strata.

Within the heat exchanger vessel 39 is a second heat exchanger element 40 which may be generally similar to element 41. Heat exchanger element 40 finds itself in a closed-loop circulation system which may employ a relatively low boiling point organic fluid such as toluene or isobutane or the like as its working fluid. A flow of such fluid is injected into heat exchanger element 40 by pipe 42, as will be further discussed, and leaves the heat exchanger vessel 39 via pipe 1 at a relatively high temperature, being substantially fully vaporized. The fluid flows through pipe 1 to be admitted to the first of a series of flash tanks 2, 14, 18, and 29.

While the generally typical flash tank 18 includes additional features, each of the flash tanks has certain elements in common. Referring particularly to the high pressure flash tank 2, it is seen that the input conduit 1 feeds fluid into that tank near its top and that it is supplied with a vapor output pipe 6 and at its bottom with a liquid output pipe 7. Flash tanks of the type suitable for use in the present invention are conventional devices in which a relatively high energy liquid of characteristic temperature and pressure is throttled as by a conventional throttling device 3. Device 3 may be a conventional throttle valve adjusted for the purpose of dropping the pressure of the fluid flowing through it so that the fluid will readily or partially flash at a relatively low temperature when supplied to flash tank 2. The drop in pressure associated with the throttling process desirably provides, in the equilibrium state, a combination of iquid and vapor within the flash tank. This is represented in flash tank 2 by a region 4 occupied by vapor and a region 5 occupied by liquid. In the usual equilibrium situation, the vapor in region 4 and the liquid in region 5 are at the same saturation temperature, this temperature being characteristic of the pressure within flash tank 2.

In this manner, flash tank 2 acts conventionally as a liquid-vapor separator; accordingly, vapor from the upper region 4 of the tank may be fed by the upper vapor transmitting pipe 6 to the input of a first stage 8 of a multiple stage vapor turbine. For the same general reasons, liquid is fed by the output pipe 7 from the liquid-containing region 5. Pipe 7 feeds liquid to a lower pressure flash tank 14 where a similar process occurs at a lower energy and pressure level. Each flash tank pressure and the mass flow rates therefrom are governed by the pressure of the fluid at the up-stream throttled inlet and by the flow area, for example, of throttle device 3 in the case of flash tank 2. Additional parameters influencing the flash tank pressure and mass flow rates are concerned with the nozzle throat area of the cooperating turbine stage and the downstream liquid throttle flow area.

In this manner, it is seen that vapor and liquid are separated in flash tank 2 at a particular pressure and energy level, and that the flows of vapor through pipe 6 and of liquid through pipe 7 are dependent upon the inlet pressure within pipe 1 connected to throttling device 3 and the throttling flow area of that device. The situation is also determined in part by the nozzle throat area of turbine elements within turbine stage 8 and by the throttling flow area of throttling device 3a feeding liquid into the succeeding flash tank 14.

As noted, flash tanks 2, 14, 18, and 29 may be similarly constituted, each operating at a progressively lower pressure and lower energy level. Each feeds vapor to a stage of the multi-stage turbine and the spent vapor from that stage is returned near to the top of the succeeding flash tank In this manner, flash tank 2 provides vapor via pipe 6 to the first turbine stage 8 whose exhaust is supplied by pipe 15 near the top of the succeeding flash tank 14. While supplying fluid via pipe 17 to the third flash tank 18, flash tank 14 supplies vapor via pipe 16 to the input of the second stage 9 of the turbine, the turbine output being supplied via pipe 19 to the vapor space near the top of flash tank 18. In a similar manner, flash tank 18 supplies liquid via pipe 25 to flash tank 29. Flash tank 18 also supplies vapor via pipe 20 to the input of the third stage 10 of the turbine, whose third stage output is, in turn, coupled by pipe 26 to the vapor region near the top of flash tank 29. Flash tank 29 has a pipe 27 coupled to its upper vapor region for supply of the vapor to the input of the last stage 11 of the turbine. The spent fluid at the output of turbine stage 11 is conveyed by pipe 28 to heat exchanger 32. In particular, pipe 28 is connected to a conventional heat exchanger element 33 within heat exchanger vessel 32 for cooling the exhaust of the turbine final stage 11. The cooled and condensed exhaust appears primarily as liquid in pipe 38 and may be pumped by a feed pump 38a into pipe 42, thus completely closing the multiple loop surface-located energy extraction system. Heat exchanger 32 will be supplied with a suitable heat transfer liquid cooled by cold water flowing through a second conventional heat exchanger element 34. Element 34 is cooled by cold water supplied, for example, from a cooling tower and admitted at input 36 and returned to the cooling tower from output 35. The necessary circulating system and other elements of the cooling tower or other cooling system are conventional and are not illustrated in the drawing.

As noted in the foregoing, the pressures characterizing the fluid flowing in the successive pipes 1, 7, 17, 25, and 30 are progressively diminishing pressures, this in part being due to energy extraction from the successive flash tanks by the associated stages of the turbine. By way of example, in a design for the system in which the hot well water enters heat exchanger element 41 at about 490° F. and leaves it about 120° F., toluene might be used as a working organic fluid in the surface system, entering heat exchanger element 40 at about 100° F. and leaving at about 470°F. The equilibrium operating absolute pressures and temperatures within the four successive flash tanks of the FIGURE might then be about:

| 2 | 117 p.s.i.a. | 400°F. |
| 14 | 30 p.s.i.a. | 280°F. |
| 18 | 10 p.s.i.a. | 208°F. |
| 29 | 3 p.s.i.a. | 145°F. |

The pressure level at the output 28 of the final turbine stage 11 might be about 0.98 p.s.i.a. It will be understood that the foregoing example is offered by way of illustration only and that the invention may be successfully operated using any of a wide range of other design characteristics.

To aid the sytem in coming to an equilibrium situation with a desired succession of pressures in the aforementioned pipes, the liquid output pipe 30 from flash tank 29 is coupled to a booster pump 31. The output of pump 31 is coupled by pipe 37 for return to pipe 1 of the system so that fluid in pipe 30 is returned to the multiple loop system along with the fluid in pipe 42. For this purpose, pipes 37 and 42 may be coupled in a tee junction such as at 37a, part way along heat exchanger element 40 within the heat exchanger vessel 39. This may be done within heat exchanger 39 so that the fluids in pipes 37 and 42 arrive at the tee junction 37a at the same temperature.

Fur further perfecting energy exchange between the deep well geothermal unit 51 and the turbine driving alternator 12, energy contained within the steam exhausted by the deep well steam turbine and flowing in pipe 22 is usefully coupled into flash tank 18 where the illustrated elements 23 and 24 of a heat exchanger which, in practice, may be unitary, are supplied within the heat transfer liquid-containing lower portion of the flash tank. By proper adjustment of the parameters of the system, and by proper selection of the low boiling point working fluid flowing successively through the series of flash tanks, the temperature within tank 18 will be such that the steam flowing in pipe 22 will be just totally condensed within elements 23 and 24. In this manner, the cool, clean water regenerated in elements 23 and 24 may be pumped by the re-injection pump 23a through pipe 21 and its extension 44 for continued use within the deep well apparatus.

The general operation of the invention will be apparent from the foregoing description. It is seen that the geothermal energy deep well system 51 consists of a deeply submerged super-heated steam generation section, a turbine section driven by the super-heated steam, and a hot water pumping section all located in a hot water source region where there is present a large quantity of hot water which may also include relatively large quantities of dissolved materials. Clean water, formed by condensing the clean turbine exhaust steam at the surface, is supplied to the seam generation section for driving the deep well tubine and is also reliably supplied to bearings in the turbine and pump sections thereof. The hot water pump section serves to increase the pressure level of the hot water so that it reaches the surface of the earth still well above its saturation pressure. The pressure of the well water entering the hot water pump is great enough to prevent cavitation damage to the pump and any consequent performance loss in the pump. In general, it is arranged that actual pressures in the hot water are maintained throughout the system above the flash point by a wide safety margin and at all points in the hot water flow system within the well.

Efficient conversion of the thermal energy contained in the pumped hot well water is effected according to the invention by the cooperating closed-loop surface energy conversion system. The geothermal pump system 51 is unique in permitting efficient conversion of heat borne upward by the hot well water while at the same time usefully converting other thermal energy that would normally be rejected and lost. Vapor production by flashing of a low boiling point fluid ideally lends itself to use within systems respectively for operating at different ones of a range of geothermal well water temperatures extending even to relatively low temperatures and, furthermore, ideally serves at a predetermined well water temperature as a multiple source of vapors at different pressures for efficient use in the successive stages of a conventional multiple stage turbine such as an axial flow type of reaction turbine similar to conventional central power plant turbines. The novel surface power conversion system is additionally advantageous in that a significant amount of energy may be saved and converted to useful power by directly inserting heat that might otherwise be lost at least in part into the one of the array of flash tanks best matched to the energy level of the exhaust steam, the steam being introduced into a heat exchanger in a flash tank separator having a working fluid temperature just below the steam condensing temperature. The preferred practice is to inject the additional energy at the highest temperature possible for compelte condensation, thus providing the greatest electrical capacity augmentation.

According to the invention, the effectiveness of the earlier Matthews system is improved and efficiency is greatly increased. The considerable heat energy contained in this clean deep-well turbine exhaust is used effectively in the surface-located system for increasing the energy produced at terminals 13 by electrical alternator 12. The normally wasted latent heat of vaporization and superheat of the exhaust steam is substantially completely utilized by coupling this heat into a predetermined one of the flash tanks operating at an appropriate temperature. This is accomplished according to the invention, by locating an exhaust steam condenser within one of the relatively low energy flash tanks, this arrangement serving to provide an additional energy input resulting in a desirably increased working fluid mass flow rate through the multiple stage power generating apparatus.

While the invention has been described in its preferred embodiments, it is to be understood that the words which have been used are words of description rather than of limitation and that changes within the purview of the appended claims may be made without departure from the true scope and spirit of the invention in its broader aspects.

We claim:

1. In geothermal deep well pump apparatus of the kind including geothermal energy exchange means for providing a working fluid, motor driven pump means responsive to said working fluid for pumping geothermal fluid always in liquid state for flow in cooperative energy exchange relation with respect to said geothermal energy exchange means to a remote station, and means for conveying said working fluid, after driving said motor driven pump means, to said remote station, energy conversion means at said remote station comprising:

first conduit means for conveying said geothermal fluid through first heat exchanger means,
   second heat exchanger means in cooperative thermal energy exchange relation with said first heat exchanger means for heating and conveying an organic fluid having a lower boiling point than said geothermal fluid,
   a plurality of flash tank means operating at successively decreasing pressure levels for separating said organic fluid into finite organic vapor and organic liquid portions within each said flash tank means,
   turbine motor means having a plurality of stages for driving power generator means,
   second conduit means for supplying said organic fluid from said second heat exchanger means to the first of said plurality of flash tank means,
   plural vapor conduit means for coupling said organic vapor portions from each said respective flash tank means for driving corresponding stages of said turbine motor means,
   plural liquid conduit means for coupling said organic liquid portions from each respective flash tank means into a next succeeding flash tank means except for the last of said plurality of flash tank means,
   plural turbine exhaust conduit means for coupling respective outputs of said plurality of turbine stages to respective inputs of all but said first and last flash tank means,
   third conduit means for coupling said organic liquid portions from said last flash tank means for flow into said second heat exchanger means, and
   condenser means coupled to the last of said turbine motor stages for supplying condensed organic liquid to said second heat exchanger means.

2. Apparatus as described in claim 1 further including third heat exchanger means within one of said flash tank means for condensing said working fluid for return thereof to said geothermal energy exchanger means for providing said working fluid.

3. Apparatus as described in claim 2 wherein said third heat exchanger means is disposed in thermal energy exchange relation with said organic liquid portion within said one of said flash tank means.

4. Apparatus as described in claim 2 wherein said one of said flash tank means is coupled intermediate the first and last of said plurality of flash tank means.

5. Apparatus as described in claim 4 wherein the normal operating temperature within said one of said plurality of flash tank means is slightly below the temperature of said working fluid passing through said third heat exchanger means.

6. Apparatus as described in claim 2 additionally including pump means at the output of said third heat exchanger means for pumping said condensed working fluid to said geothermal energy exchanger means.

7. Apparatus as described in claim 1 further including first pump means coupled in active relation to said third conduit means.

8. Apparatus as described in claim 7 further including second pump means disposed between said condenser means and said second heat exchanger means for cooperative operation with respect to said first pump means.

9. Apparatus as described in claim 2 further including means coupled to said first heat exchanger means for re-injecting said geothermal fluid into the earth.

* * * * *